United States Patent [19]
Watai et al.

[11] Patent Number: 5,961,197
[45] Date of Patent: Oct. 5, 1999

[54] SURFACE LIGHT SOURCE DEVICE

[75] Inventors: Kayoko Watai, Hasuda; Hiromi Sasako, Tokyo, both of Japan

[73] Assignees: Enplas Corporation, Kawaguchi; Yasuhiro Koike, Yokohama

[21] Appl. No.: 08/762,802

[22] Filed: Dec. 9, 1996

[30] Foreign Application Priority Data

Dec. 14, 1995 [JP] Japan ................................. 7-346979
Dec. 14, 1995 [JP] Japan ................................. 7-346980

[51] Int. Cl.[6] .......................................................... F21V 8/00
[52] U.S. Cl. ............................................. 362/31; 362/558
[58] Field of Search ............................... 362/31, 32, 558, 362/551

[56] References Cited

U.S. PATENT DOCUMENTS

| | | | |
|---|---|---|---|
| 4,277,817 | 7/1981 | Hehr | 362/31 |
| 4,714,983 | 12/1987 | Lang | 362/31 |
| 5,178,447 | 1/1993 | Murase et al. | |
| 5,289,351 | 2/1994 | Kashima et al. | 362/31 |
| 5,410,454 | 4/1995 | Murase et al. | 362/31 |
| 5,709,447 | 1/1998 | Murakami et al. | 362/31 |
| 5,772,305 | 6/1998 | Ishikawa et al. | 362/31 |

FOREIGN PATENT DOCUMENTS

| | | |
|---|---|---|
| 5-88168 | 4/1993 | Japan . |
| 6-68003 | 9/1994 | Japan . |
| 7-36037 | 2/1995 | Japan . |

OTHER PUBLICATIONS

U.S. application No. 08/289,316, Ishikawa, filed Aug. 11, 1994.

*Primary Examiner*—Laura K. Tso
*Attorney, Agent, or Firm*—Staas & Halsey, LLP

[57] ABSTRACT

A wedge-shaped light scattering guide plate 10 employed in a surface light source device of side-light type has a width equal to the length of a primary light source element. An incidence end surface 11 is formed as a matte surface (rough surface) by a matting process. The incidence end surface 11 is provided with roughness which is uniform or increases toward end portions. The roughened incidence end surface 11 produces scattered light in the vicinity of the incidence end surface, especially at both side end portions. The scattered light contributes to elimination of variation in luminance which tends to occur in the vicinity of the incidence end surface 11. A light diffusing plate may be interposed between the primary light source element and the light scattering guide plate.

3 Claims, 9 Drawing Sheets

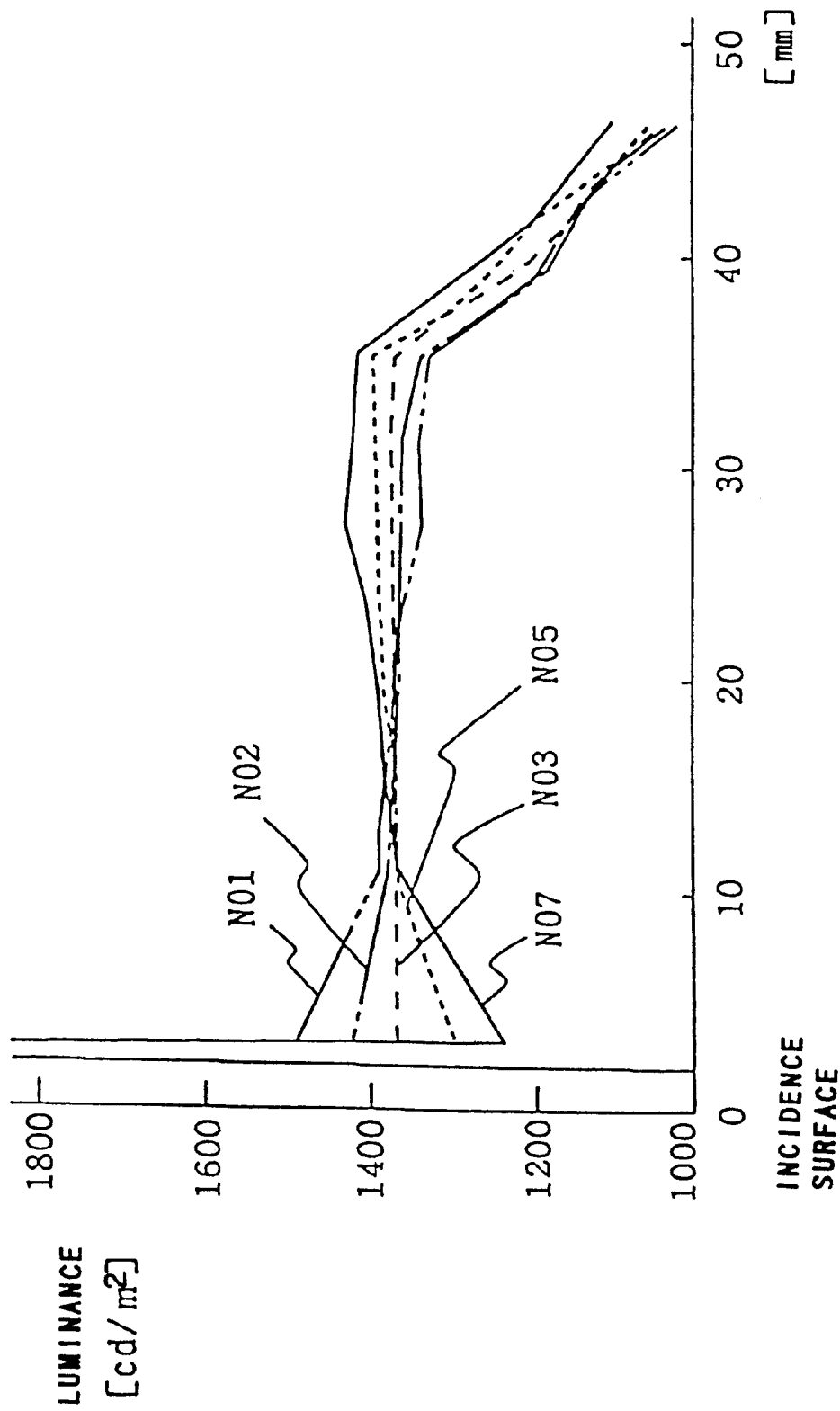

SURFACE LIGHT SOURCE DEVICE

BACKGROUND

1. Field of the Invention

The present invention relates to surface light source devices of side-light type used for liquid crystal displays and the like and, more particularly, to a surface light source device of side-light type with emitting directivity utilizing a light scattering guide plate which decreases in thickness as distance increases from a primary light source.

2. Related Art

Surface light source devices referred to as "side-light type surface light source devices" have conventionally been known and are used, for example, for back-lighting of liquid crystal displays. A surface light source device of side-light type has a light guide plate and a primary light source disposed on one side thereof. A rod-shaped primary light source element such as a cold-cathode ray tube is used as the primary light source. Illuminating light emitted from the primary light source enters the light guide plate via an incidence end surface of the light guide plate, deflected therein, and emitted from a flat surface of the light guide plate to be used for illuminating a liquid crystal panel or the like.

Since the primary light source of a surface light source device of side-light type is arranged on one side of the light guide plate, the arrangement for back-lighting of liquid crystal panel can avoid increasing in thickness.

As a material for a light guide plate incorporated in a surface light source device of side-light type, a light scattering guide element having scattering power therein is more advantageously used than a transparent material from the viewpoint of emission efficiency of illuminating light. Such a light guide plate is referred to as "light scattering guide plate". Sheet-like shapes with a substantially uniform thickness and shapes gradually decreasing in thickness with the distance from a primary light source may be employable. In general, the latter is more advantageous than the former from the viewpoint of emission efficiency of illuminating light.

FIG. 1 is an exploded perspective view showing a general configuration of a side-light type surface light source device of the latter type utilizing a light scattering guide plate. A side-light type surface light source device 1 has a light scattering guide plate 2 and a primary light source 3 disposed on one side thereof. The light scattering guide plate 2, a reflection sheet 4 and a prism sheet 5 are disposed in a laminated state. The primary light source 3 comprises a cold-cathode tube (fluorescent lamp) 6 and a reflector 7 which partially surrounds the tube and consists of a reflection member having a substantially semi-circular sectional configuration. Illuminating light emitted from the open side of the reflector 7 is incident upon an incidence end surface of the light scattering guide plate 2.

The reflection sheet 4 consists of a sheet-shaped regular reflection member made of metal foil or the like, alternatively a sheet-shaped irregular reflection member made of a white PET film or the like.

The light scattering guide plate 2 consists of a light scattering guide element having a wedge-like sectional configuration. A light scattering guide element is an optical material having a light-guiding function and a volumetric scattering function which is formed, for example, by uniformly dispersing light transmittable fine particles in a matrix made of poly methyl methacrylate (PMMA), the particles having a refractive index different from that of the matrix.

In the surface light source device of side-light type shown in FIG. 1, as indicated in FIGS. 2 and 2A by a section taken along the line I—I shown in FIG. 1, illuminating light L is introduced into the light scattering guide plate 2 through an incidence end surface T which is an end surface facing the primary light source 3. The illuminating light L propagates through the light scattering guide plate 2 while being repeatedly reflected between a flat surface facing the reflection sheet 4 and a flat surface facing the prism sheet 5 (hereinafter referred to as "emission surface") under a scattering effect provided by the light transmittable fine particles. Such a reflection sheet 4 employed, the illuminating light L is further subject to an irregular reflection effect.

As the angle at which the illuminating light L is incident upon the emission surface gradually decreases during the propagation, and components with incident angles equal to or smaller than the critical angle relative to the emission surface are emitted from the emission surface. Illuminating light L1 emitted from the emission surface is emitted as scattered light as a result of scattering caused by the light transmittable fine particles in the light scattering guide plate 2 and irregular reflection caused by the reflection sheet 4. However, the principal emission direction of the illuminating light L1 is inclined toward the top end of the wedge-like configuration relative to the front direction, as shown in an enlarged illustration indicated by the arrow B.

In other words, the emitted light L1 has directivity, thereby providing the side-light type surface light source device 1 with emitting directivity.

The prism sheet 5 is formed of a light transmittable sheet material such as polycarbonate and is formed with a prism surface on the side thereof facing the light scattering guide plate 2. This prism surface includes protrusions, repeatedly formed from the incidence end surface T toward the end of the wedge-like configuration, having a triangular sectional configuration extending substantially in parallel with the incidence end surface T of the light scattering guide plate 2. The prism sheet 5 corrects the principal emission direction of the emitted light L1 so as to direct it substantially forwardly of the emission surface at inclined surfaces of the triangular protrusions.

As a result, this side-light type surface light source device 1 provides a characteristic, such that a more efficient frontal emission is realized compared with a side-light type surface light source device of a type in which a light scattering guide plate is formed with a substantially uniform thickness.

Side-light type surface light source devices with emitting directivity include those comprising a light transmittable member or translucent member to form a light scattering guide plate with a wedge-like configuration or a configuration similar to a wedge-like configuration and having a scattering film or the like formed on the emitting surface or rear surface thereof.

In such a side-light type surface light source device with emitting directivity, linear portions having a higher luminance level (bright lines) as indicated by the reference symbol K in FIG. 1 and band-like portions having a lower luminance level (dark bands) are produced in the form of bands at roughly constant intervals in parallel with the incidence end surface, on the emission surface near the incidence end surface. The bright lines originate from illuminating light which has entered the light scattering guide plate via the upper and lower edges of the incidence end surface. The dark bands appear between the bright lines with a width roughly corresponding to the thickness of the incidence end surface and have a luminance level higher than the average luminance of the emission surface. Such variation in luminance is sometimes referred to as "reflective appearance" and prevents a side-light type surface light source device with emitting directivity from generating high quality illuminating light.

In addition to the above-described first type of variation in luminance (reflective appearance), side-light type surface light source devices are subject to a second type of variation in luminance. Specifically, when the light scattering guide plate 2 is designed with a great width H (the longitudinal length of the fluorescent lamp 6), regions of low luminance appear around peripheral portions of the emission surface in the vicinity of the incidence end surface (see the reference symbol X). This is because electrodes 6a and 6b are formed on both ends of the fluorescent lamp 6 and, in the vicinity of those electrodes 6a and 6b, the tube has internal regions having no fluorescent material applied thereon which significantly reduce the amount of the illuminating light L emitted (emission density) in the vicinity of both ends of the fluorescent lamp 6.

Variation in luminance caused by such effects can be suppressed by making the width H of the light scattering guide plate 2 smaller than the length of the fluorescent lamp 6 to some extent (for example, by the length of the areas of the electrodes). However, the reduction in the width H of the light scattering guide plate 2 means a reduction in an effective light-emitting area, which is quite disadvantageous.

In other words, if variation in luminance caused by such effects can be effectively avoided, it will be possible to design the light scattering guide plate 2 with a width H substantially equal to the length of the fluorescent lamp 6 to provide a surface light source device which has a relatively large emission surface and which can therefore be applied to a liquid crystal display having a relatively large display panel.

That is, if a relatively short fluorescent lamp can be used for a light scattering guide plate having an emission surface of a prescribed size, the surface light source device as a whole or a liquid crystal display incorporating the same can be made compact.

As one method of overcoming the shortage of luminance around peripheral portions, for example, a method as disclosed in Japanese unexamined patent publication No. H5-88168 is known wherein a rough surface is formed in a central portion of an incidence end face, the portion being a region subjected to a maximum amount of illuminating light. Although this can reduce variation in luminance in a side-light type surface light source device formed with a light guide plate having a substantially uniform thickness, it increases variation in luminance when applied to a side-light type surface light source device with emitting directivity.

Further, U.S. Pat. No. 5,178,447 discloses configuration of an incidence end surface using a rough surface. However, the roughening of an incidence end surface is applied to a sheet-shaped transparent light guide plate having a constant thickness; the width of the light scattering guide plate is shorter than the length of the rod-shaped primary light source element used as a primary light source; and it does not disclose the idea of roughening the incidence end surface as a means for avoiding the reduction in the width of the light scattering guide plate.

Further, unexamined Japanese utility model publication No. H6-68003 discloses configuration of an incidence end surface of a wedged-shaped transparent light guide plate using a rough surface, but it does not disclose the idea of roughening the incidence end surface in an attempt to avoid the reduction in the width of a light scattering guide plate.

OBJECT AND SUMMARY OF THE INVENTION

The present invention has been proposed to solve the problem of the above-described two types of variation in luminance in side-light type surface light source devices utilizing a light scattering guide plate. That is, it is an object of the present invention to reduce band-like variation in luminance (the first type of variation in luminance) which occurs on an emission surface in the vicinity of an incidence end surface of in a side-light type surface light source device utilizing a light scattering guide plate and shortage of luminance (the second type of variation in luminance) which occurs around peripheral portions of the emission surface in the vicinity of the incidence end surface and, especially to maintain uniformity of luminance on the emission surface of the light scattering guide plate as a whole under a condition that a light scattering guide plate is used which has a width substantially equal to the length of a rod-shaped light source element, including electrode portions, used as a primary light source.

In order to solve the above-described problems, according to the present invention, in a side-light type surface light source device utilizing a light scattering guide plate whose thickness decreases with the distance from an incidence end surface, a primary light source element substantially equal in length to the light scattering guide plate is employed, wherein illuminating light emitted by the primary light source element is diffused before it is introduced into the light scattering guide plate via the incidence end surface.

In one mode of the invention, the incidence end surface is a rough surface by which the illuminating light from the primary light source element is diffused before it is introduced into the light scattering guide plate via the incidence end surface. The roughness of the incidence end surface is preferably in a range of 0.05 $\mu$m–0.30 $\mu$m in terms of arithmetical mean roughness Ra on a center line of a plane in parallel with the emission surface.

In another mode of the invention, the incidence end surface is a rough surface formed so as to have a tendency that light diffusing power increases from the central portion toward both end portions, thereby diffusing the illuminating light from the primary light source element before it is introduced into the light scattering guide plate via the incidence end surface. In this case, the roughness of the incidence end surface is preferably in a range of 0.10 $\mu$m–0.50 $\mu$m in terms of arithmetical mean roughness Ra on a center line of a plane parallel with the emission surface.

Further, as a modification of those modes of the invention, a light diffusing plate may be interposed between the primary light source element and the light scattering guide plate. A modification of the first mode of the invention can be obtained by providing the light diffusing plate with uniform roughness. Further, a modification of the second mode of the invention can be obtained by providing the light diffusing plate with the tendency that light diffusing power increases from a central portion toward both end portions.

The presence of such preferred ranges for the roughness of the incidence end surface is based on the following reasons. First, if the incidence end surface is not roughened at all, most components of the light from the primary light source are incident upon the incidence end surface at an angle near the right angle and are propagated through the light scattering guide plate. In this process, the emission angle relative to the emission surface gradually decreases with the thickness of the light scattering guide plate, which results in emission of components with angles smaller than the critical angle from the emission surface. This leads to a tendency that illuminating light having the components as described above entering from the incidence end surface is emitted in a smaller amount (i.e., dark) in the vicinity of the incidence end surface and is emitted in an increasing amount as it becomes farther from the incidence end surface.

On the contrary, components incident upon the incidence end surface at an angle farther from the right angle are emitted from an emission surface near the incidence end surface without being subjected to a sufficient scattering effect to form several bright lines periodically. Illuminating light having such components is emitted in a decreasing amount as it becomes farther from the incidence end surface.

On the other hand, if the incidence end surface is formed as a rough surface, incident light entering from this incidence end surface can be scattered simultaneously with the incidence. Therefore, components incident upon the incidence end surface at an angle near the right angle are emitted earlier near to the incidence end surface to increase the luminance level of dark band portions which are produced in the vicinity of the incidence end surface. On the other hand, components incident upon the incidence end surface at an angle farther from the right angle are subjected to a scattering effect at the incidence end surface and are therefore unlikely to form sharp bright lines. This makes variation in luminance inconspicuous.

However, too strong of a light diffusing power of the rough surface makes the amount of illuminating light emitted from the emission surface near the incidence end surface excessive, which significantly biases the distribution of amount of light toward the incidence end surface when the emission surface is viewed as a whole, resulting in a perceptible inclination of luminance. This is the reason for the above-mentioned range of 0.05 $\mu$m–0.30 $\mu$m (for constant light diffusing power) or 0.10 $\mu$m–0.50 $\mu$m (for light diffusing power increasing from the central portion toward both end portions) in terms of arithmetical mean roughness Ra. This is the condition to allow variation in luminance to be sufficiently reduced and to allow a high quality display image to be displayed when applied to a liquid crystal display.

The above and other features of the present invention will be apparent from the following description with reference to the accompanying drawings.

BRIEF DESCRIPTION OF DRAWINGS

FIGS. 2 and 2A are sectional views taken along the line I—I in FIG. 1 and an enlarged position of FIG. 2;

FIG. 7 is a graph showing the results of measurement on the samples No. 1 through No. 7 with a condition on length varied;

PREFERRED EMBODIMENTS

Figure 2:
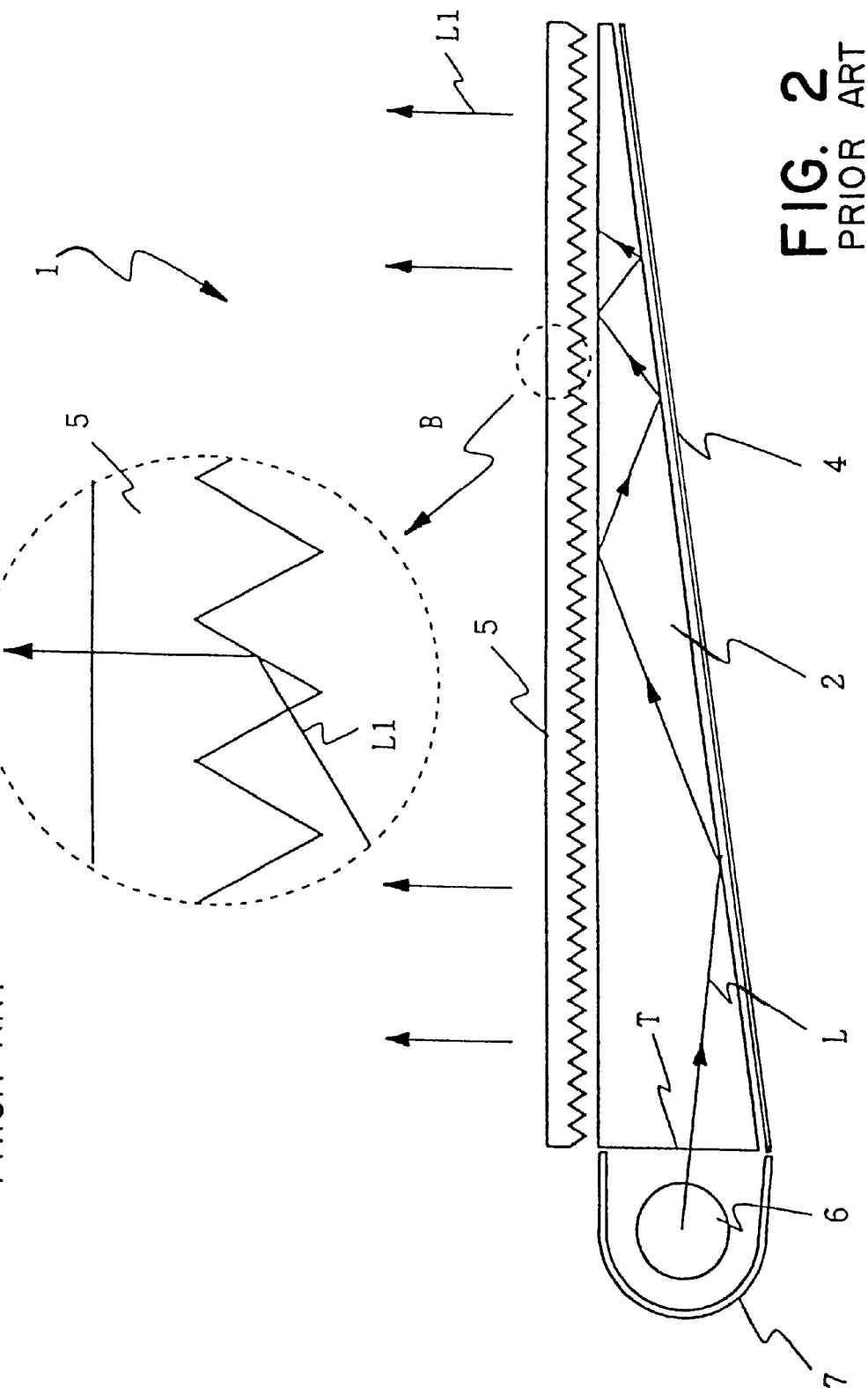
Figure 3:
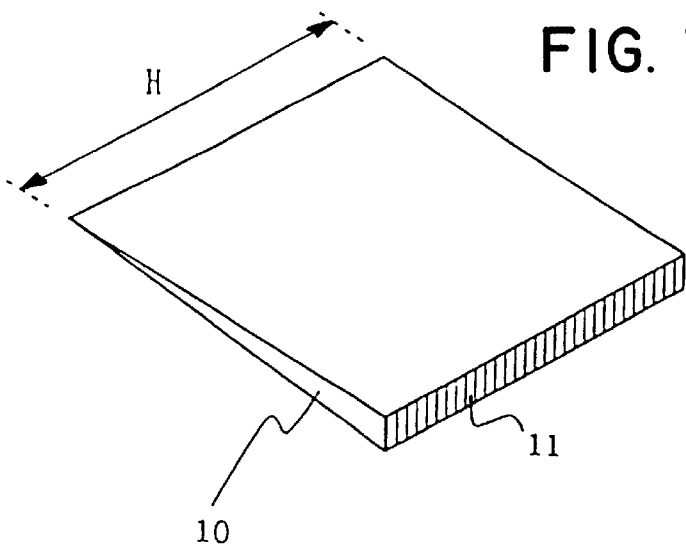
FIG. 3 is a perspective view showing a light scattering guide plate employed in a surface light source device of side-light type according to the first embodiment of the invention.

FIG. 3 is a perspective view of a light scattering guide plate employed in a surface light source device of side-light type according to the first embodiment of the invention as viewed from the side of the incidence end surface. The surface light source device of side-light type in this mode is the same in configuration as the surface light source device of side-light type described with reference to FIG. 2 except that the structure of a light scattering guide plate 10 is different. Therefore, duplication in description will be avoided as much as possible.

In this surface light source device of side-light type, the width H of the light scattering guide plate 10 is formed so as to be equal to the length of the fluorescent lamp to enlarge the dimensions of the emission surface relative to the fluorescent lamp compared to a surface light source device of side-light type having a conventional configuration.

An incidence end surface 11 of the light scattering guide plate 10 is formed as a matte surface (rough surface) having uniform roughness by means of a matting process and, thereby reducing variation in luminance in this embodiment.

Figure 4:
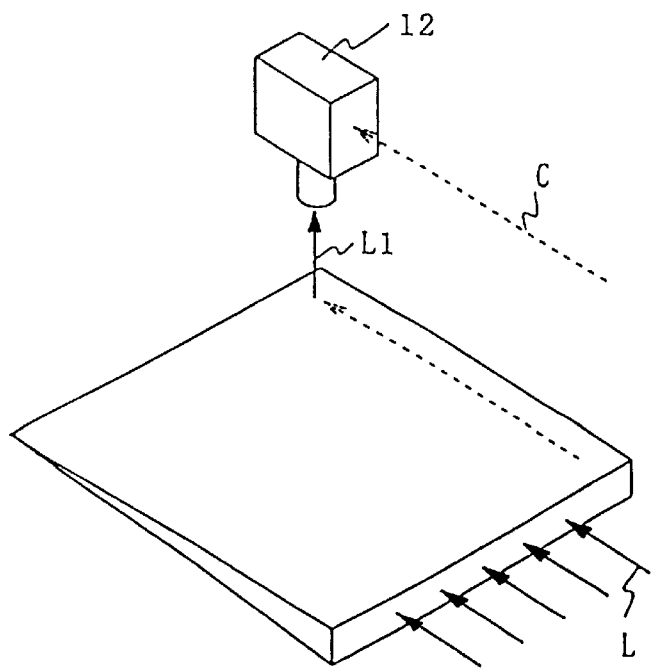
FIG. 4 is a perspective view for explaining measurement of luminance distribution on the light scattering guide plate shown in FIG. 3.

With the arrangement shown in FIG. 4, distribution of luminance was measured on the emission surface of a surface light source device of side-light type employing such a light scattering guide plate 10. The measurement was performed on a case wherein a light scattering guide plate 10 having a length of 170 mm from the incidence end surface to the end of the wedge-like configuration was used with directivity of emitted light corrected in the direction perpendicular to the emission surface. The distribution of luminance was obtained by measuring the amount of the emitted light with a luminance measuring device 12 scanned from the side of the incidence end surface toward the end of the wedge-like configuration as indicated by the arrow C. As a result, it was revealed that the distribution of the amount of the emitted light was biased toward the incidence end surface compared with a case wherein the incidence end surface was not processed.

Figure 5A:
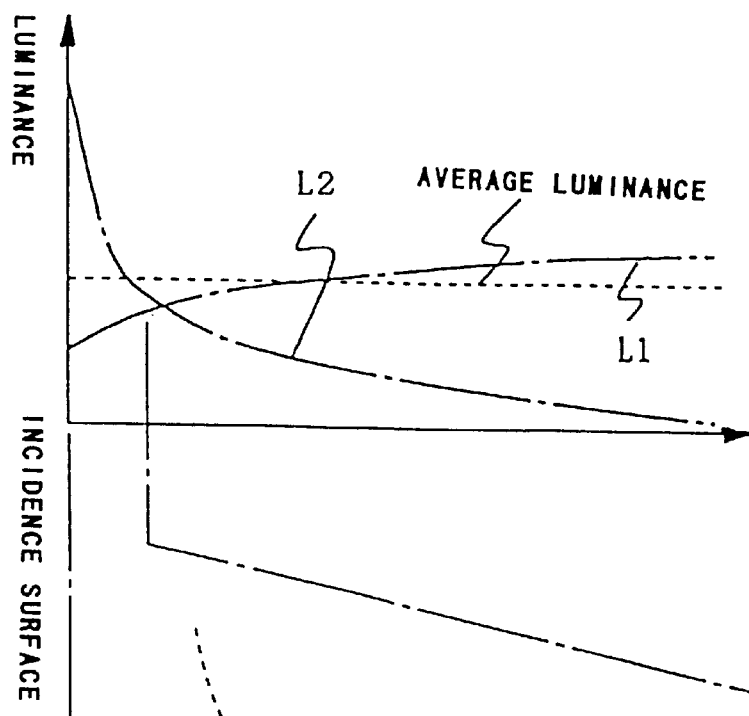
FIGS. 5A–5C are illustrations explaining the principle of the occurrence of bright lines.
Figure 5B:
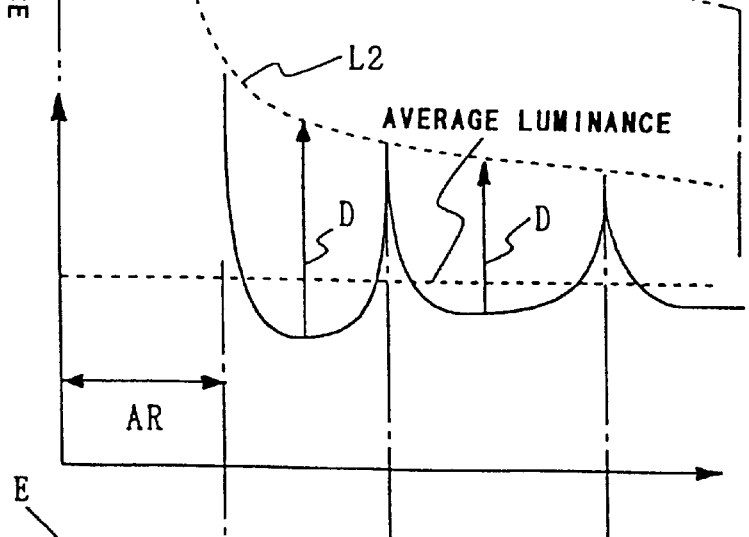
Figure 5C:
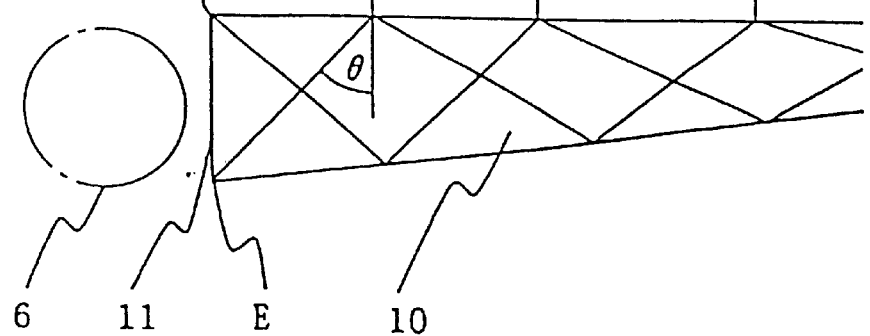

FIG. 5 is an illustration for explaining the principle of the occurrence of bright lines and consists of a graph FIG. 5A, whose horizonal axis corresponds to a partial sectional view of the light scattering guide plate shown in FIG. 5C and a graph, FIG. 5B showing changes in luminance in the vicinity of the incidence end surface.

The mechanism of occurrence of bright lines will now be described with reference to FIGS. 3A–3C. First, it was found that peaks of luminance appears when the incidence end surface 11 is formed as a mirror surface as shown at FIG. 5B and that the peaks of luminance are observed as bright lines.

The peaks of luminance disappear when upper and lower edges E of the incidence end surface 11 are shaded by a shading plate (see the view at FIG. 5C). This says that, in a surface light source device of side-light type, bright lines are produced by illuminating light passing near the edges E of the incidence end surface 11.

Illuminating light incident upon the incidence end surface is propagated through the light scattering guide plate while being repeatedly subjected to internal reflection. In this process of propagation, the angle of incidence upon the emission surface at the time of internal reflection gradually decreases with the distance from the incidence end surface, increasing the possibility of generation of light that clears the condition of the critical angle to escape from the light scattering guide plate. Meanwhile, although the light incident upon the incidence end surface 11 is scattered in the light scattering guide plate 10, the scattering angle is generally small (forward scattering) and the major part of the light amount travels in the direction of the depth of the light scattering guide plate 10 (the direction orthogonal to the incidence end surface).

It can be concluded from the above that when the incidence end surface 11 is a mirror surface, as indicated by the reference symbol L1 in FIG. 5A, there is a factor which gradually increases the amount of emitted light as it becomes farther from the incidence end surface.

On the other hand, the traveling direction of illuminating light that enters the light scattering guide plate through the areas around the edges E is significantly disturbed by the edges E and such illuminating light includes much more components having greater incident angles than illuminating light incident upon the incidence end surface 11 excluding the edges. Therefore, the illuminating light that has entered at the upper and lower edges E of the light scattering guide plate 10 mostly consists of components which are at angles equal to or smaller than the critical angle θ relative to the emission surface or the flat surface on the side of the reflection sheet (rear surface) and the major components are emitted directly from the emission surface or the flat surface on the side of the reflection sheet.

The remaining components of the illuminating light that has entered at the edges E are propagated through the light scattering guide plate 10 and are gradually emitted. In conclusion, since the illuminating light that enters in the vicinity of the edges is subjected to the above-described effect and its range of incident angles is limited to upper and lower half parts compare with the illuminating light that enters from the incidence end surface 11 excluding the edges, it exhibits a tendency that the amount of emitted light rapidly decreases as it travels away from the incidence end surface 11. This is illustrated as an envelope connecting peaks of luminance by the curve indicated by the reference symbol L2 in graphs 5A and 5B.

By forming the incidence end surface 11 as a rough surface, the curve indicated by the reference symbol L1 can be raised near the incidence end surface. Further, for the regions having a low level of luminance (dark bands) between the peaks as indicated by the reference symbol D, the level of luminance is simultaneously increased as a whole. This makes variation in luminance formed by the bright lines and dark bands inconspicuous.

However, if the distribution of the amount of light is excessively biased by the roughened incidence end surface, a reverse inclination of luminance extending from the incidence surface 11 toward the end of the wedge-like configuration is produced. If this inclination of luminance becomes excessive in an application to a liquid crystal display for displaying images, the displayed images will be poor.

Close examination on the degree of roughness revealed that it is preferable that the incidence end surface 11 is formed as a rough surface with arithmetical mean roughness Ra in a range of 0.05 μm–0.30 μm on the center line of the incidence end surface 11 in parallel with the emission surface. When a surface light source device of side-light type utilizing a light scattering guide plate that satisfies this condition of roughness was applied to a liquid crystal display for displaying color images, a distribution of luminance could be obtained which was sufficiently uniform for practical use.

It was also found that such inclination and variation of luminance is almost imperceptible even if the display screen is watched carefully if the arithmetical mean roughness Ra is set in a range of 0.05 μm–0.20 μm. The arithmetical mean roughness Ra is a unit of surface roughness specified by JIS B0031-1994.

Figure 6A:
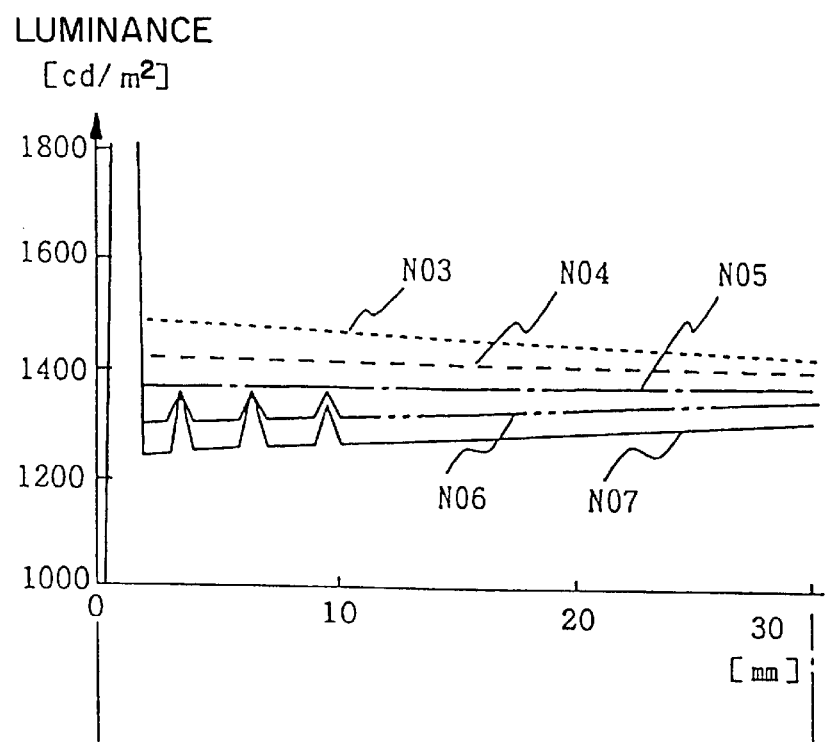
FIGS. 6A and 6B are graphs showing the results of measurement on samples No. 1 through No. 7.
Figure 6B:
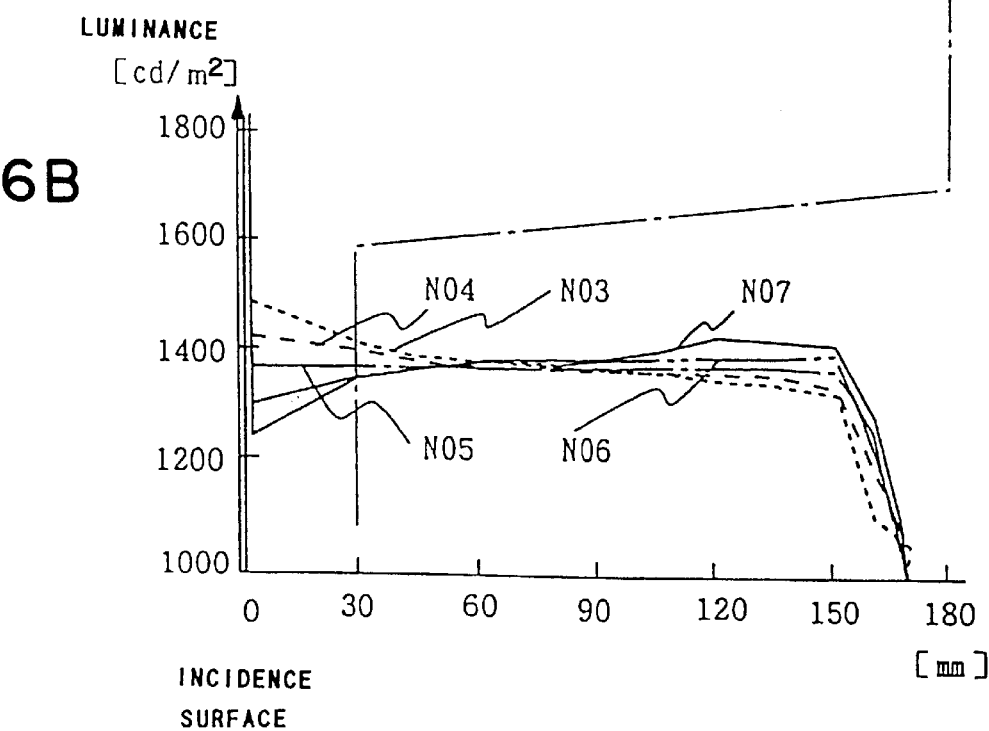

FIGS. 6A and 6B show the results of measurement of distribution of luminance on seven light scattering guide plates 10 (samples No. 1 through No. 7 or No. 1–No. 7) having the arithmetical mean roughness Ra as shown below and consists of a graph FIG. 6A showing distribution of luminance near the incidence end surfaces (within a range of about 30 mm or less therefrom) and a graph, FIG. 6B, showing overall distribution of luminance. The measurement was performed using light scattering guide plates 10 having a length 170 mm from the incidence end surface 11 to the end of the wedge-like configuration.

Sample No. 1 (No. 1) Ra=0.40 μm
Sample No. 2 (No. 2) Ra=0.30 μm
Sample No. 3 (No. 3) Ra=0.20 μm
Sample No. 4 (No. 4) Ra=0.10 μm
Sample No. 5 (No. 5) Ra=0.05 μm
Sample No. 6 (No. 6) Ra=0.02 μm
Sample No. 7 (No. 7) Ra=mirror surface First, as shown at in FIG. 6A, on the sample having arithmetical mean roughness Ra of 0.02 μm (No. 6), peaks of luminance remain to produce significant variation in luminance. On the contrary, on the sample having arithmetical mean roughness Ra of 0.05 μm (No. 5), the level of luminance increased at the dark band portions, allowing variation of luminance to be imperceptible. On the other hand, a roughened surface increases the level of luminance near the incidence end surface as shown in FIG. 6B and, although not shown, the sample having arithmetical mean roughness Ra of 0.40 μm (No. 1) was unpracticable because it had too large an inclination of luminance. Further, in the case of the sample having arithmetical mean roughness Ra of 0.30 μm (No. 2), although there was an inclination of luminance of a certain magnitude, it was still on a practicable level.

Meanwhile, FIG. 7 shows the results of measurement on distribution of the amount of emitted light performed on light scattering guide plates 11 having a length of 45 mm and, in this case, it was found that the inclination of luminance of the sample having arithmetical mean roughness Ra of 0.20 μm (No. 3) can be most significantly reduced.

In this embodiment of the invention, the range AR from the incidence end surface 11 defined by the critical angle θ in FIG. 5 is shaded near the incidence end surface.

Thus, by employing a light scattering guide plate formed using a matting process to have an incidence end surface as a rough surface having arithmetical mean roughness Ra in a range of 0.05 μm–0.30 μm on the center line of the incidence end surface 11 in parallel with the emission surface, the distribution of the amount of illuminating light incident upon the incidence end surface can be biased toward the incidence end surface to reduce variation in luminance that occurs on the emission surface in the vicinity of the incidence end surface.

Further, the occurrence of an inclination of variation can be effectively avoided at the same time to provide a surface light source device having a uniform level of luminance on the entire emission surface.

As a result of similar examination on various light scattering guide plates having an emission surface of size in a range of 3–12 inches and a light incidence end surface of a thickness in a range of 2–5 mm in addition to the above-described samples (No. 1 through No. 7), any sample whose light incidence end surface was formed as a rough surface in the above-described range had reduced variation in luminance near the light incidence end surface and could provide preferable characteristics.

The first mode of carrying out the invention as described above is directed to suppression of variation in luminance of the type produced by bright lines and dark bands appearing on the emission surface near the incidence end surface of the light scattering guide plate (first type). On the contrary, a second mode of carrying out the invention described below is directed to suppression of variation in luminance caused by shortage of luminance that occurs around peripheral portions of the emission surface near the incidence end surface of the light scattering guide plate (second type).

However, in both of these embodiments of the invention, illuminating light from the primary light source element is commonly subjected to light diffusion before it is introduced into the light scattering guide plate. Therefore, in conclusion, it is expected for these modes of carrying out the invention that the first and second types of variation in luminance are simultaneously reduced, although the emphasis is differently placed between them.

Figure 8:
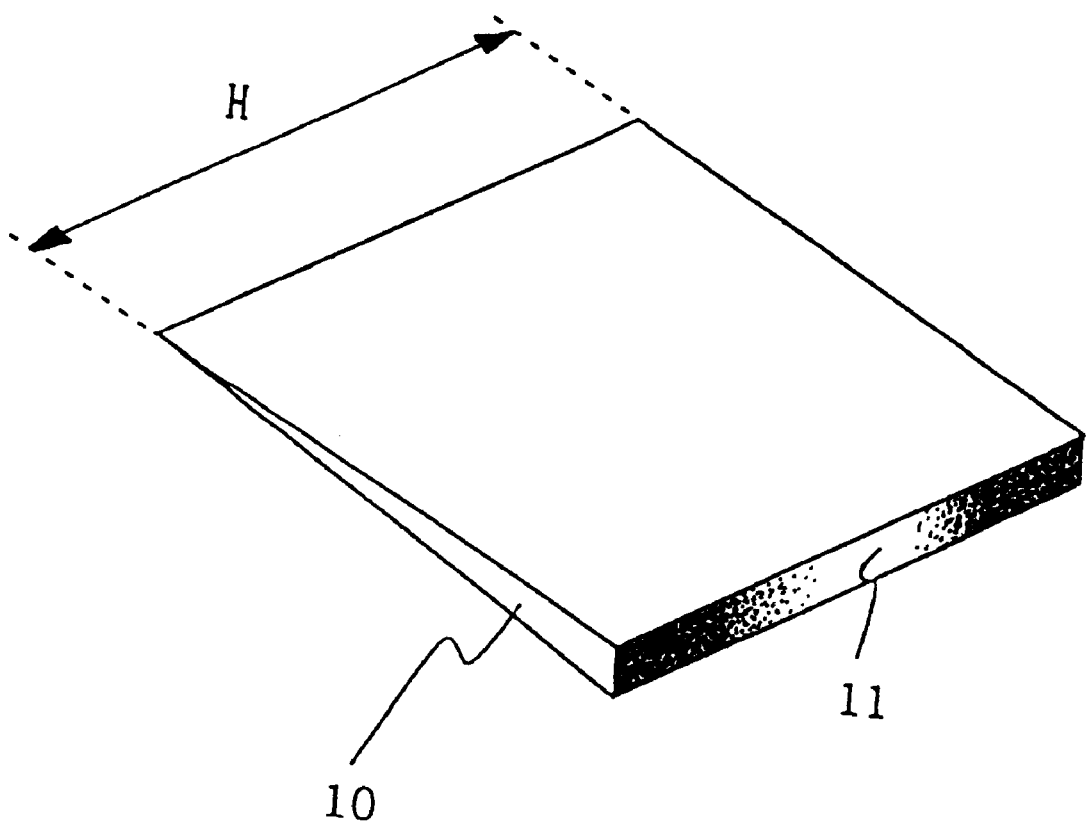
FIG. 8 is a perspective view showing a light scattering guide plate employed in a surface light source device of side-light type according to the second embodiment of the invention.

FIG. 8 is a perspective view of a light scattering guide plate employed in a surface light source device of side-light type according to the second embodiment of the invention as viewed from the side of the incidence end surface. The surface light source device of side-light type in this mode is the same in configuration as the surface light source device of side-light type described with reference to FIGS. 1 and 2 except that the structure of a light scattering guide plate 10 is different. Therefore, duplication in description will be avoided as much as possible.

In this surface light source device of side-light type, the width H of the light scattering guide plate 10 is formed to be equal to the length of the fluorescent lamp to enlarge the dimensions of the emission surface relative to the fluorescent lamp compared with a surface light source device of side-light type having a conventional configuration.

An incidence end surface 11 of the light scattering guide plate 10 is formed as a matte surface (rough surface) using a matting process, and the matte surface is formed to have roughness that increases toward end portions thereof on a second-order-functional basis. As a result, this embodiment of the invention makes it possible to effectively avoid variation in luminance occurring near the incidence end surface, especially variation in luminance of the second type as described above.

As in the first embodiment, with the arrangement shown in FIG. 4, distribution of luminance was measured on the emission surface of a surface light source device of side-light type employing such a light scattering guide plate 10. The measurement was performed on a case wherein a light scattering guide plate 10 having a length of 68 mm from the incidence end surface 11 to the end of the wedge-like configuration was used with directivity of emitted light corrected in the direction perpendicular to the emission surface. The distribution of luminance was obtained by measuring the luminance with a luminance measuring device 12 scanned from the side of the incidence end surface toward the end of the wedge-like configuration as indicated by the arrow C.

The light scattering guide plate in this mode is also roughened on its incidence end surface. Therefore, for the same reason as described in the first embodiment of the invention, the amount of the emitted light is increased near the incidence end surface when compared to a case wherein the incidence end surface is not processed at all. As a result, the first type of variation in luminance as described above is moderated.

As previously mentioned, if the incidence end surface 11 is extremely roughened, the distribution of the amount of the emitted light is excessively biased toward the incidence end surface, resulting in variation in luminance which is against what is intended. Specifically, the amount of light is reduced near the end of the wedge-like configuration compared to that near the incidence end surface 11. Further, efficient incidence of illuminating light L can not be achieved.

Figure 1:
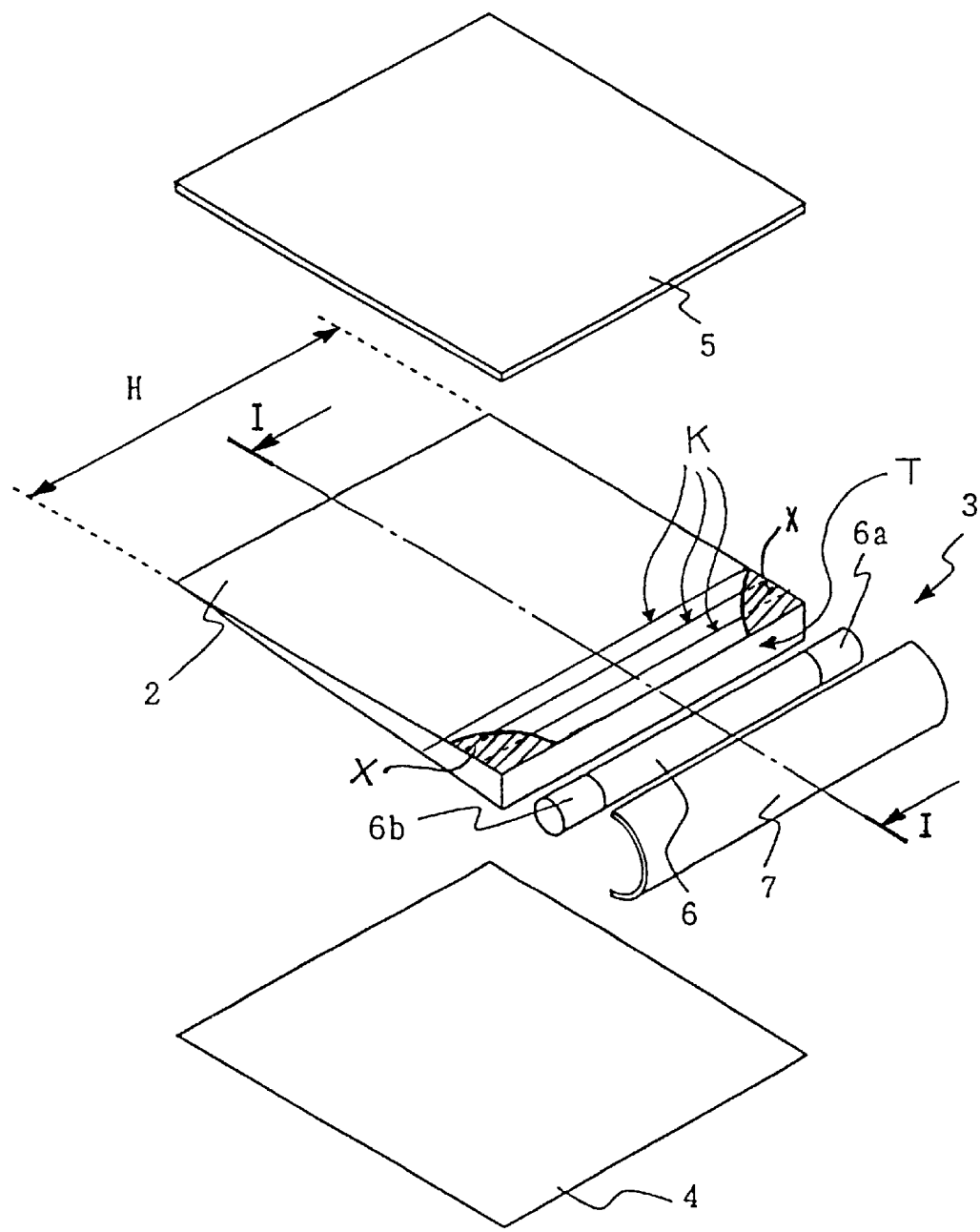
FIG. 1 is an exploded perspective view showing a conventional surface light source device of side-light type.

As described with reference to FIG. 1, there is however a strong tendency that shortage of the amount of light occurs around peripheral portions in the vicinity of the incidence end surface 11 (the portions indicated by the reference symbol X in FIG. 1). In order to compensate for this tendency, the matting process is performed to form the incidence end surface 11 of the light scattering guide plate 10 in this mode of carrying out the invention such that the roughness increases toward both side end portions quadradically. As a result, scattered light is produced at both side end portions of the incidence end surface before introduction into the light scattering guide plate, which contributes to emission from the portions indicated by the reference symbol X in FIG. 1.

The central portion of the incidence end surface 11 is provided with relatively low roughness because shortage of the amount of light is less likely to occur in this portion than in both side end portions.

Figure 9:
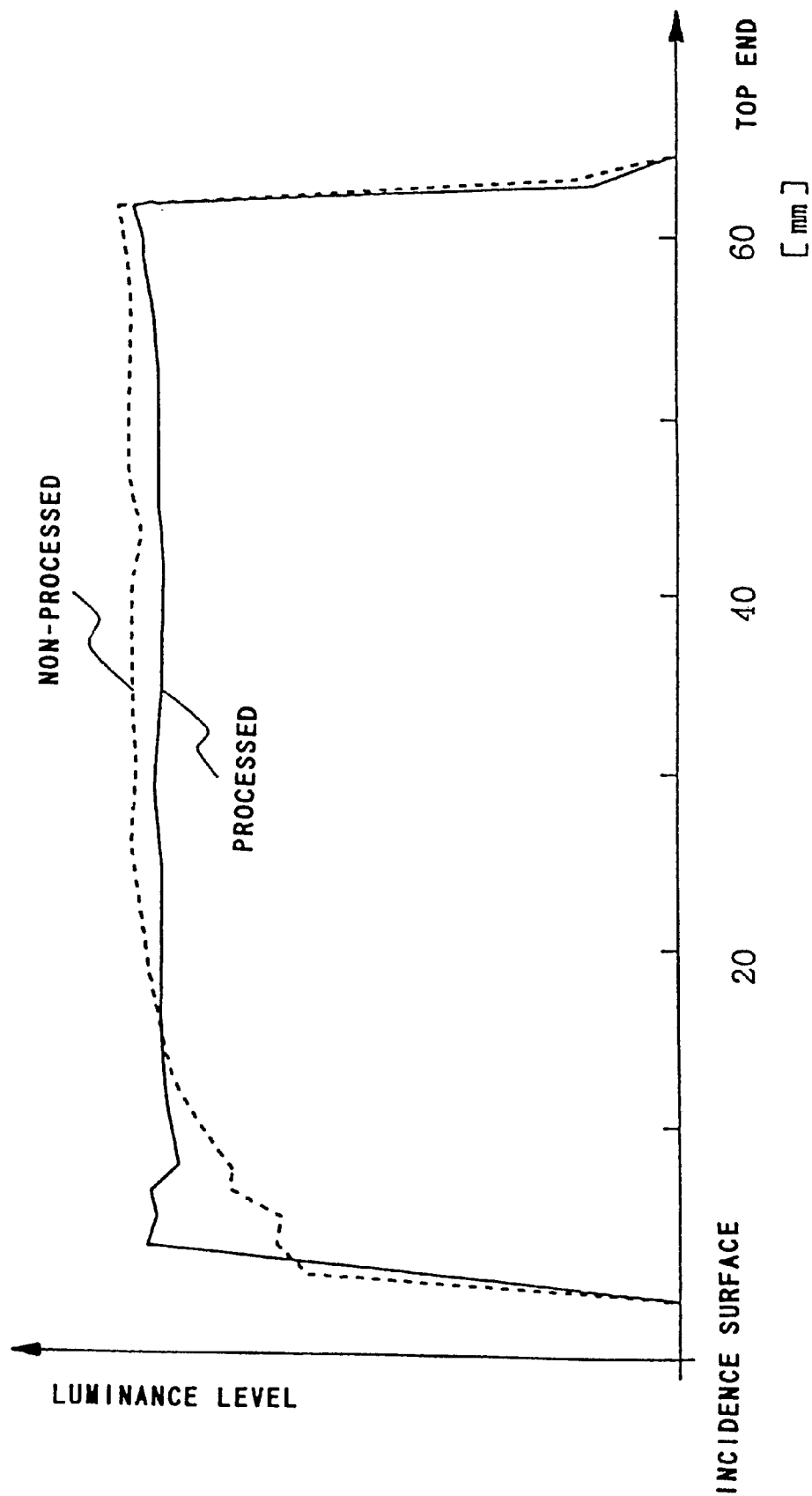
FIG. 9 is a graph showing the results of measurement on a surface light source device of side-light type utilizing the light scattering guide plate shown in FIG. 8.

According to the results of measurement on the incidence end surface 11 which was variously roughened, an increase in roughness toward both side end portions in a range of arithmetical mean roughness Ra of 0.10 μm–0.50 μm and in a range of ten-point average roughness Rz of 1.00 μm–2.00 μm allowed variation in luminance to be avoided in a practically effective fashion. FIG. 9 is a graph showing the results of measurement of luminance performed under a condition that a central portion of the incidence end surface is substantially formed as a mirror surface and that an inclination of roughness in the above-described ranges is provided toward both side end portions (solid line) in comparison to a case wherein no matting process is performed (broken line). In this measurement of luminance, the distribution of luminance near the peripheral portions of the emission surface was measured.

This graph clearly shows that the inclined roughness as described above improves uniformity of luminance.

Figure 10:
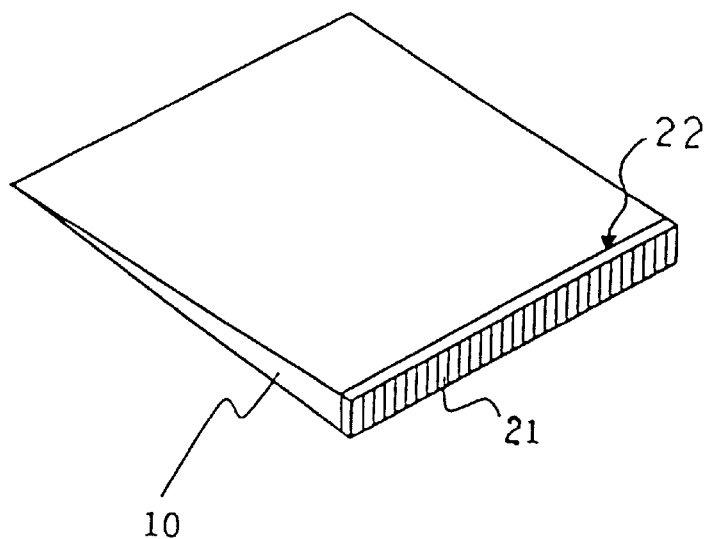
FIG. 10 is a perspective view showing a light scattering guide plate employed in a surface light source device of side-light type according to a modification of the first embodiment of the invention.
Figure 11:
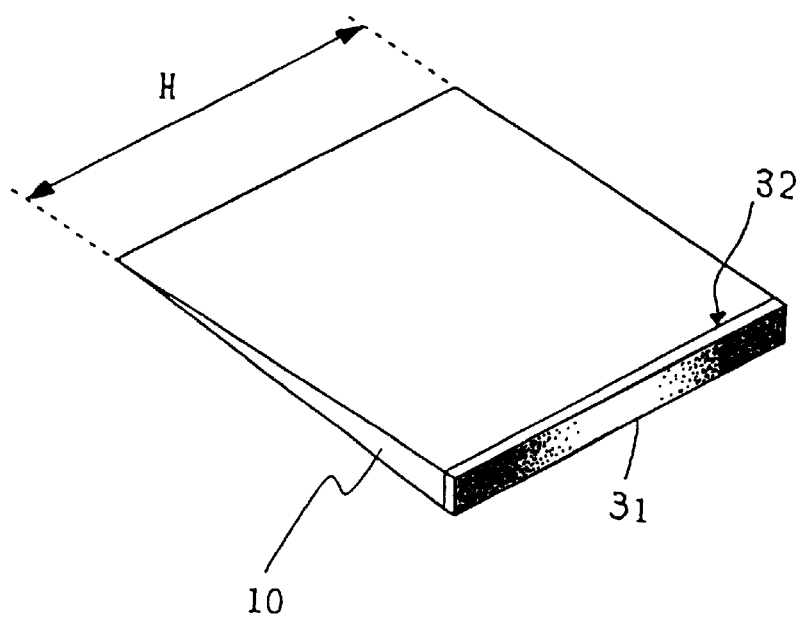
FIG. 11 is a perspective view showing a light scattering guide plate employed in a surface light source device of side-light type according to a modification of the second of carrying out the invention.

As modifications of the above-described first and second embodiments of the invention, a light diffusing plate may be interposed between the primary light source element and the light scattering guide plate. If the light diffusing plate is roughened uniformly, a modification of the first embodiment is obtained as shown in FIG. 10. Further, if the light diffusing plate is provided with the tendency that its light diffusing power increases from the central portion toward both end portions, a modification of the second embodiment is obtained as shown in FIG. 11. It is preferable that boundaries 22 and 32 between light diffusing plates 21 and 31 and the light scattering guide plates 10 in both of the modifications are, for example, adhesive layers and that the light diffusing plates 21 and 31 are put in contact with and fixed to end surfaces (relatively thick end surfaces) of the light scattering guide plates 10.

The light diffusing plates 21 and 31 provide a function similar to that of the incidence end surface 11 of the first or second embodiment. It will be therefore easily understood that these modifications achieve suppression of variation in luminance similar to that in the first or second embodiment.

In addition to the matting process employed in this embodiment, as the method of forming the end surface on which illuminating light is incident, various means for forming a rough surface may be used including a blasting process utilizing a sand paper and roughening using a chemical etching process.

Although the light scattering guide plate has a simple wedge-like sectional configuration in the above-described embodiments of the invention, light scattering guide plates having other sectional configurations may be used as long as their thickness decreases as the primary light source element becomes farther.

Further, although the above-described modes of carrying out the invention refer to a case wherein illuminating light is incident upon a single incidence end surface, the present invention may be applied to a surface light source of side-light type having a configuration wherein illuminating light is incident upon a plurality of end surfaces as incidence end surfaces.

Furthermore, although the above-described embodiments of refer to applications to a surface light source device of a liquid crystal display, it goes without saying that the present invention may be used as an illuminating unit for various other illuminating devices, displays and the like.

What is claimed is:

1. A surface light source device of side-light type including a light scattering guide late having a thickness decreasing with distance from an incidence end surface and a rod-shaped primary light source element disposed along said incidence end surface wherein illuminating light from said primary light source element is deflected by said light scattering guide plate and is effected by internal scattering within said light scattering guide plate and is emitted from an emission surface of said light scattering guide plate, a length of said primary light source element being substantially equal to a width of said light scattering guide plate; and the illuminating light from said primary light source element being diffused via said incidence end surface before being introduced into said light scattering guide plate, wherein said incidence end surface has a roughness in a range of 0.05 $\mu$m–0.30 $\mu$m in terms of arithmetical mean roughness on a center line of a plane in parallel with said emission surface.

2. A surface light source device of side-light type including a light scattering guide plate having a thickness decreasing with distance from an incidence end surface and a rod-shaped primary light source element disposed along said incidence end surface wherein illuminating light from said primary light source element is deflected by said light scattering guide plate and is effected by internal scattering within said light scattering guide plate and is emitted from an emission surface of said light scattering guide plate, a length of said primary light source element being substantially equal to a width of said light scattering guide plate; and said incident end surface being a rough surface provided with a tendency to have scattering power increasing from a central portion toward both end portions thereof whereby the illuminating light from said primary light source element being diffused via said incidence end surface before being introduced into said light scattering guide plate, wherein said incidence end surface has a roughness in a range of 0.10 $\mu$m–0.50 $\mu$m in terms of arithmetical mean roughness on a center line of a plane in parallel with said emission surface.

3. A surface light source device of side-light type including a light scattering guide late having a thickness decreasing with distance from an incidence end surface and a rod-shaped primary light source element disposed along said incidence end surface wherein illuminating light from said primary light source element is deflected by said light scattering guide plate and is effected by internal scattering within said light scattering guide plate and is emitted from an emission surface of said light scattering guide plate, a length of said primary light source element being substantially equal to a width of said light scattering guide plate; and a diffusing plate provided with a tendency to have scattering power increasing from a central portion toward both end portions thereof being interposed between said incident end surface and said primary light source element whereby the illuminating light from said primary light source element being diffused via said incidence end surface before being introduced into said light scattering guide plate.

* * * * *